US008559086B2

(12) United States Patent
Davis et al.

(10) Patent No.: US 8,559,086 B2
(45) Date of Patent: Oct. 15, 2013

(54) PIEZORESISTIVE SENSORS FOR MEMS DEVICE HAVING REJECTION OF UNDESIRED MOTION

(75) Inventors: Wyatt O. Davis, Bothell, WA (US); Yunfei Ma, Redmond, WA (US); Dean R. Brown, Lynnwood, WA (US); Jason B. Tauscher, Sammanish, WA (US)

(73) Assignee: Microvision, Inc., Redmond, WA (US)

( * ) Notice: Subject to any disclaimer, the term of this patent is extended or adjusted under 35 U.S.C. 154(b) by 912 days.

(21) Appl. No.: 12/706,980

(22) Filed: Feb. 17, 2010

(65) Prior Publication Data
US 2011/0199284 A1 Aug. 18, 2011

(51) Int. Cl.
*G02B 26/08* (2006.01)

(52) U.S. Cl.
USPC .................................................. 359/200.8

(58) Field of Classification Search
USPC .......... 359/198.1–199.4, 200.6–200.8, 202.1, 359/221.2, 223.1–225.1, 226.2, 904, 359/290–295, 838, 846, 871, 872; 250/204, 250/559.06, 559.29, 230, 234; 347/255–260; 353/39, 98–99; 385/15–18, 22; 398/12, 19, 45
See application file for complete search history.

(56) References Cited

U.S. PATENT DOCUMENTS 6,075,585 A * 6/2000 Minne et al. ............... 355/71
8,511,838 B2 * 8/2013 Rothaar .................... 353/99

* cited by examiner

*Primary Examiner* — Jennifer L. Doak
(74) *Attorney, Agent, or Firm* — Kevin D. Wills (57) ABSTRACT

Briefly, in accordance with one or more embodiments, a piezoresistive stress sensor comprises a plurality of piezoresistive elements coupled in a bridge circuit disposed on, near, or contiguous to a flexure to detect torsional flexing about an axis of the flexure. The bridge circuit has at least two nodes disposed along the axis of the flexure and at least two nodes disposed off the axis of the flexure to maximize, or nearly maximize, an output of the bridge circuit in response to the torsional flexing of the flexure. A torsional flexing component of the output signal of the bridge circuit is relatively increased with respect to a component of the output signal generated by non-torsional stress of the flexure, or a component of the output signal generated by non-torsional stress of the flexure is reduced with respect to the torsional flexing component of the output signal, or combinations thereof.

20 Claims, 10 Drawing Sheets

PIEZORESISTIVE SENSORS FOR MEMS DEVICE HAVING REJECTION OF UNDESIRED MOTION

BACKGROUND

Piezoresistive (PZR) stress sensors can be used for position sensing for microelectromechanical system (MEMS) scanning mirrors in applications such as scanned beam display systems. The amount of mechanical strain detected by the sensor is related to the position of the scanning mirror. Thus, a strain signal obtained by the sensor may be used as a feedback input in the scanning control system to provide correction to the drive signal to facilitate control of the movement of the scanning mirror. Ideally, the strain sensor is capable of producing a signal in response only to a certain kind of motion of the scanning mirror, for example torsional deformation of the flexures supporting the scanning mirror. In practice however, such sensors may be sensitive to other types of motion which result from deviation from the ideal case caused by material fabrication or process variation. For example variations in certain properties of the sensor can cause it to generate a feedback signal having a component due to bending deformation of the flexures in addition to the torsional response. Consequently, the detection of undesired deformations by the sensor may cause the scanning control system to apply a less than ideal and/or an incorrect control signal since the feedback signal from the sensor may contain components due to motion other than the type of motion being controlled.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Figure 1:
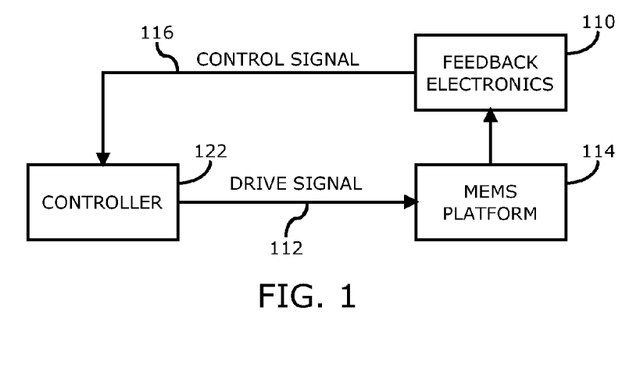
FIG. 1 is a block diagram of a control system for a microelectromechanical system (MEMS) platform in accordance with one or more embodiments.

Referring now to FIG. 1, a block diagram of a control system for a microelectromechanical system (MEMS) platform in accordance with one or more embodiments will be discussed. As shown in FIG. 1, control system 100 may comprise controller 122 providing a drive signal 112 to a microelectromechanical (MEMS) platform 114. In one or more embodiments, MEMS platform 114 may be part of a scanned beam display such as shown in and described with respect to FIG. 9, below. In general, MEMS platform 114 may comprise any type of MEMS device that operates electromechanically in response to a drive signal 112, and the scope of the claimed subject matter is not limited in this respect. Control system 100 may further include feedback electronics 110 that include one or more sensors to detect the motion of MEMS platform 114 to provide a control signal 116 as a feedback signal to controller 122 to facilitate the drive signal 112 applied to MEMS platform 114. As discussed further herein, such a sensor may comprise a piezorestive (PZR) sensor that is capable of transducing mechanical movement of at least a portion of MEMS platform 114 into an electrical signal to generate control signal 116. Further details of an example embodiment of feedback electronics 110 including a PZR sensor for control system 110 are shown in and described with respect to FIG. 2, below.

Figure 2:
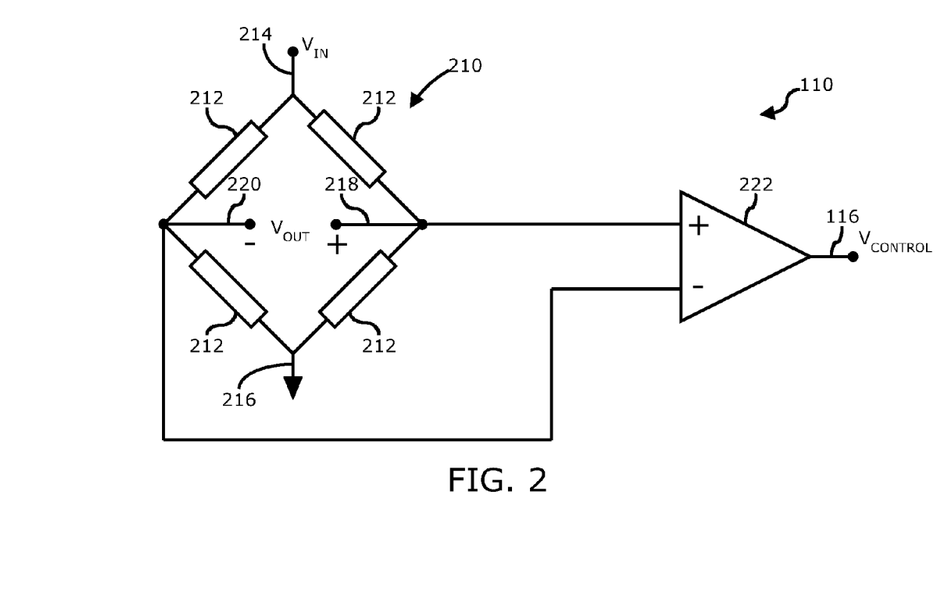
FIG. 2 is a diagram of feedback electronics for microelectromechanical system (MEMS) platform control system in accordance with one or more embodiments.

Referring now FIG. 2, a diagram of feedback electronics for microelectromechanical system (MEMS) platform control system in accordance with one or more embodiments will be discussed. In one or more embodiments of feedback electronics 110, an amplification stage 222 may be used to create a control signal 116, labeled as $V_{CONTROL}$ in FIG. 2, from an output signal $V_{OUT}$ taken at node 218 and node 220 of a PZR sensor 210. In one or more embodiments, PZR sensor comprises PZR elements 212 arranged in a bridge circuit configuration as shown in FIG. 2, although the scope of the claimed subject matter is not limited in this respect. Amplification stage 222 may be an instrumentation amplifier, for example an operational amplifier as shown in FIG. 2, and/or may comprise one or more amplification stages capable of providing gain or attenuation of the output signal. Although one amplification stage 222 is shown in FIG. 2, multiple amplification stages may be utilized in one or more alternative embodiments. The control signal 116 $V_{CONTROL}$ provided by amplification stage 222 may be used in feedback control systems, such as control system 100 of FIG. 1, that generate horizontal drive (HDrive) and/or vertical drive (VDrive) signals to control the amplitude, frequency, phase, and/or other aspects of the motion of MEMS platform 114 of FIG. 1, and that cause the PZR sensor 210 to respond with an output signal $V_{OUT}$ in response to the motion. For example, the motion may be the rotation a suspended body containing a scanning mirror, and/or the rotations of a frame of MEMS platform 114 as shown in and described with respect to FIG. 3, below. In some embodiments, MEMS platform 114 may comprise a MEMS die fabricated from silicon, wherein amplification stage or stages 222 may be implemented with discrete electronics connected to the MEMS die, or amplification stages 222 alternatively may be fabricated integrally to the MEMS die using semiconductor integrated circuit technology. Control system 100 may be utilized to control the biaxial scan trajectory of MEMS platform 114. In one or more embodiments as discussed in further detail herein, to optimize the performance of control system 100, the output signal $V_{OUT}$ of PZR sensor ideally 210 should correspond only to one type of motion, for example only to the rotations of the body 310 or frame 328 of MEMS platform 114 as shown in and described with respect to FIG. 3, below. If the output signal $V_{OUT}$ of PZR sensor 210 contains contributions from other types of motion such as translations or rotations of the body 310 or frame 328 of MEMS platform 114 that put the corresponding flexures into bending instead of torsion, the operation of control system 100 may be less than optimal or more complex to account for such additional motions. If the additional motions detected by PZR sensor 210 become too severe, such sensitivity to ancillary motion may degrade the image quality in a biaxial scan display system such as scanned beam display 900 of FIG. 9, below. In one or more embodiments, the response of PZR sensor 210 to ancillary motions may be reduced or effectively eliminated as discussed in further detail herein. Structural details of an example MEMS platform 114 that incorporates a PZR sensor 210 are shown in and described with respect to FIG. 3, below.

Figure 3A:
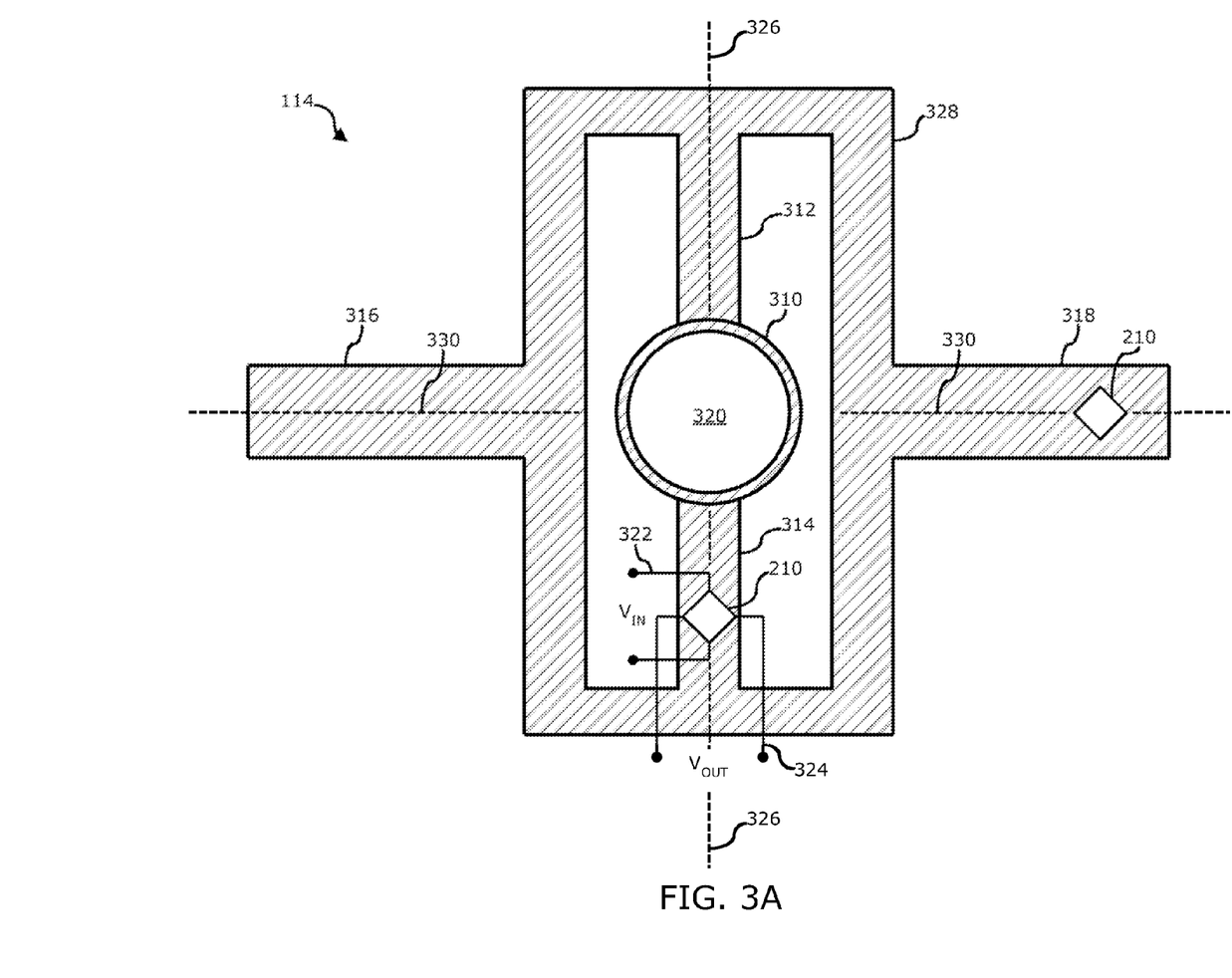
FIG. 3A and FIG. 3B are a top view diagrams of a microelectromechanical system (MEMS) scanning platform having piezoresistive position sensors in accordance with one or more embodiments.
Figure 3B:
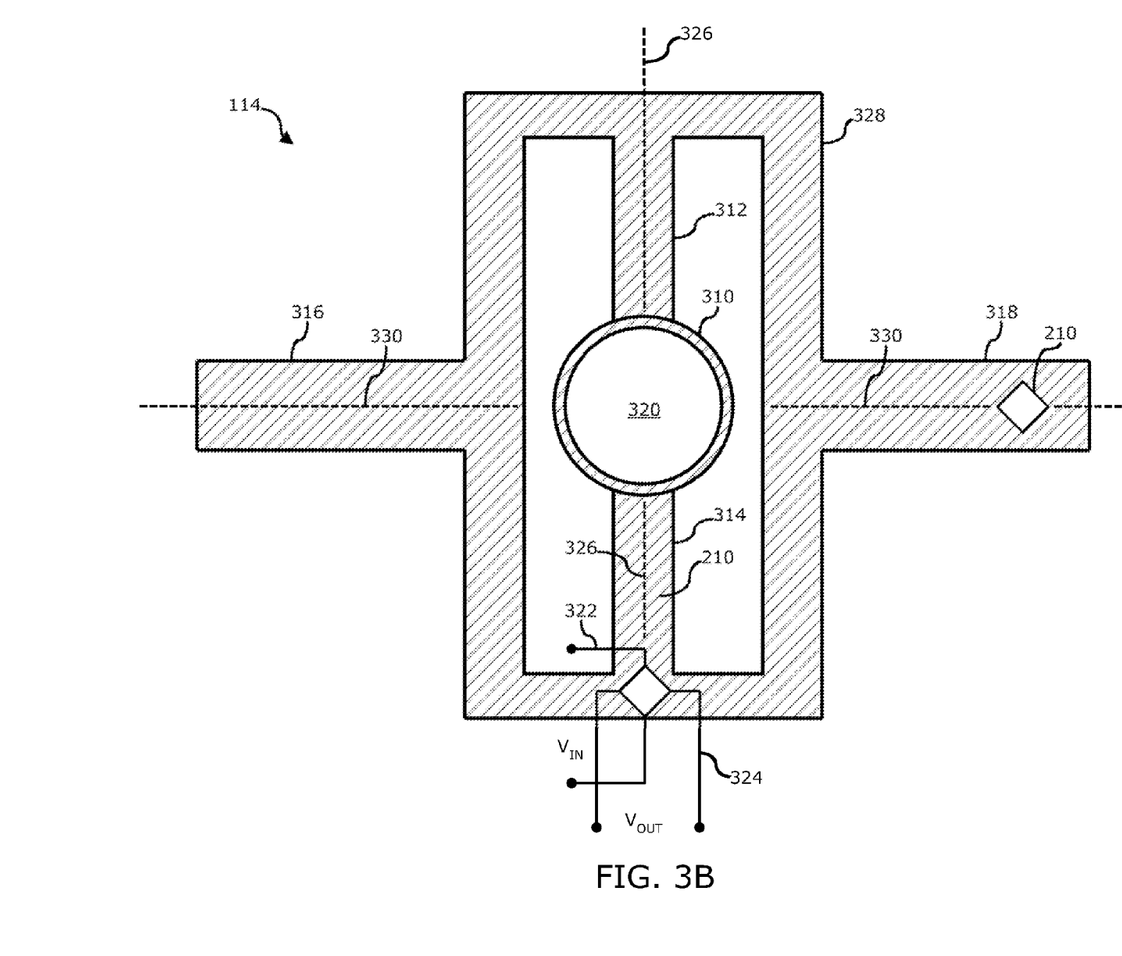

Referring now FIG. 3A and FIG. 3B, top view diagrams of a microelectromechanical system (MEMS) platform having piezoresistive position sensors in accordance with one or more embodiments will be discussed. As shown in FIG. 3A and FIG. 3B, the MEMS platform 114 of FIG. 1 may comprise a microelectromechanical system based scanner comprising a suspended body 310 having scanning mirror 320 formed thereon. Suspended body 310 is suspended by flexure 312 and/or flexure 314 which in turn are coupled to a frame 328. During operation of MEMS platform 114, suspended body 310 may be actuated to rotate about axis 326 via torsional movement of the flexures via a motor circuit (not shown). Frame 328 and flexures 312 and 314 may be made of silicon or the like which provides sufficient support and flexing characteristics to allow such movement of suspended body 310 when driven via the motor circuit. In one or more embodiments, flexures 312 and 314 may be fabricated from a different material than the material from which frame fabricated. In such embodiments, a silicon piezoresistive (PZR) sensor 210 fabricated from silicon may be arranged to react to torsional response of a flexure 312 or 314 that is attached to frame 328. However, this is merely an example arrangement of frame 328 and flexures 312 and 314, and the scope of the claimed subject matter is not limited in this respect. When MEMS platform 114 is used in scanned beam display 900 of FIG. 9, below, the rotational movement of suspended body 310 about axis 326 is used for scanning of beam 912 along a first axis in a projected image. Frame 328 may be supported by flexure 316 and flexure 318 along axis 330. Scanning of beam 912 about a second axis that is orthogonal to the first axis may be accomplished via rotational movement of suspended body 310 long with frame 328 about axis 330 via further actuation of the motor circuit. The combination of movement of suspended body 310 about axis 326 and axis 330 allows a two-dimensional image to be generated by scanned beam display 100 as discussed herein.

Figure 4:
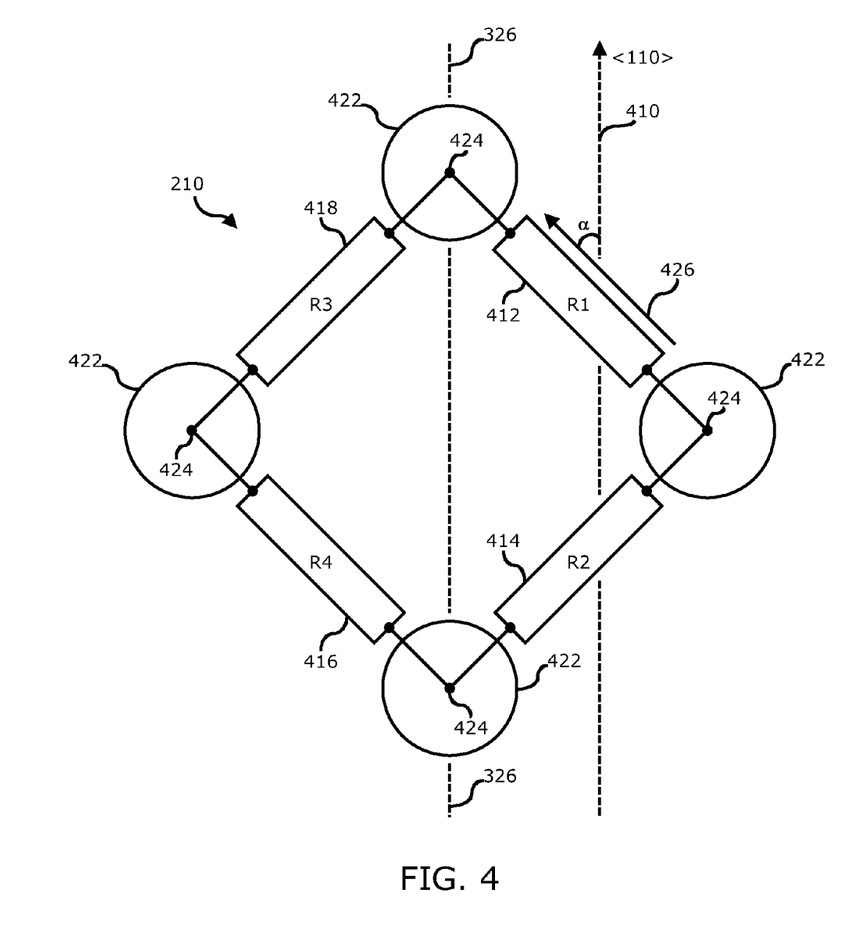
FIG. 4 is a diagram illustrating detail of piezoresistive position sensors in a bridge arrangement in accordance with one or more embodiments.

During scanning movement of suspended body 310, a feedback signal may be obtained that is indicative of the amount of rotational movement of suspended body 310 about axis 326. The feedback signal may then be utilized by controller 122 of FIG. 1 to provide any needed correction in the drive signal 112 applied to the motor circuit driving MEMS platform 114 as control signal 116. Such a feedback signal may be obtained by a piezoresistive (PZR) sensor 210 disposed on or near or contiguous to at least one of the flexures such as flexure 314 and/or flexure 318. In the embodiment shown in FIG. 3A, a PZR sensor 210 is shown disposed on flexure 314, and in the embodiment shown in FIG. 3B, a PZR sensor 210 is shown disposed on frame 328 rather than being disposed on either flexure 312 or 314. In general, one or more PZR sensors 210 may be located at any one or more various locations including on, near, or contiguous to one or more flexures such as flexure 312, flexure 314, flexure 316 and/or flexure 318, and/or on, near, or contiguous to frame 328, and the scope of the claimed subject matter is not limited in these respects. PZR sensor 210 may comprise one or more PZR elements as shown and described in further detail with respect to FIG. 4, below. A PZR element may refer to an element having a resistance that is a function of the amount of mechanical stress within the element. The coefficient of resistivity dependence on a stress σ may be denoted by the symbol π. Thus, a PZR element may have a resistance expressed as:

$$R(\sigma) = R_0 + \pi\sigma$$

wherein the resistance of the PZR element is equal to the resistance of the PZR element with no stress plus the coefficient of resistivity times the amount of added stress. In one or more embodiments, PZR sensor 210 may comprise multiple PZR elements in a bridge circuit arrangement to provide a differential output as the feedback signal, for example as shown in and described with respect to FIG. 4, below. Thus, an input signal $V_{IN}$ applied to PZR sensor 210 via terminals 322 may result in an output signal $V_{OUT}$ at terminals 324 proportional to the change in resistance in the PZR elements of the sensor 210, in response to the amount of flex of flexure 314 which is representative of the rotational position of suspended body 310. In one or more embodiments, the input signal $V_{IN}$ is a direct current (dc) signal that results in an output signal $V_{OUT}$ that varies with amount of torsional flexing of flexure 314 as the resistance of the PZR elements of PZR sensor 210 changes in response to stress in flexure 314. Further details of PZR sensor 210 are shown in and described with respect to FIG. 4, below.

Referring now to FIG. 4, a diagram illustrating detail of piezoresistive position sensors in a bridge arrangement in accordance with one or more embodiments will be discussed. FIG. 4 shows one example arrangement of PZR sensor 210 as shown in and described with respect to FIG. 2 and FIG. 3, above. In one or more embodiments, PZR sensor 210 comprises multiple PZR elements such as PZR element 412 having a resistance R1, PZR element 414 having a resistance R2, PZR element 416 having a resistance R4, and PZR element 418 having a resistance R3, in a bridge circuit arrangement, also referred to as a Wheatstone bridge. In such a bridge circuit, a given PZR element is coupled to an adjacent PZR element via one of four nodes 424. In one or more particular embodiments, PZR sensor 210 may be generally aligned with axis 326 such that two of the nodes 424 are generally aligned on axis 326 and the other two of the nodes 424 are disposed off of axis 326 resulting in bridge 210 being generally oriented in a diamond shaped arrangement with respect to flexure axis 326. In general in one or more embodiments, such orienting of the PZR elements at an approximately 45 degree angle with respect to torsion axis 326 of flexure 314 may maximize, or nearly maximize, the output signal of PZR sensor 210 in response to torsional stress of flexure 314. Frame 328 of scanning platform 114 of FIG. 3 may be fabricated such that the crystal axis 410 (represented as <110>) shown in FIG. 4 is generally aligned parallel to flexure axis 326, although the scope of the claimed subject matter is not limited in this respect.

For the bridge circuit arrangement of PZR sensor 210, let i be an index representing the number of PZR elements in the bridge circuit such that i=1, . . . , 4. The resistance of each PZR element can be decomposed as the sum of a nominal value $R_0$ and a variation from the nominal value $\Delta R_i$:

$$R_i = R_0 + \Delta R_i$$

The output voltage $V_{OUT}$ can be expressed as:

$$V_{OUT} = V_{IN}\left(\frac{R_0+\Delta R_2}{2R_0+\Delta R_1+\Delta R_2} - \frac{R_0+\Delta R_4}{2R_0+\Delta R_3+\Delta R_4}\right),$$

which has a simplified expression when all the resistance variations $\Delta R_i$ are equal to $\Delta R$:

$$V_{OUT} = -V_{IN}\left(\frac{\Delta R}{R_0}\right).$$

In general the resistance variations will be unequal. Situations that may cause resistance variation inequality in the values of the PZR elements are discussed with respect to FIG. 5 and FIG. 6, below. In one or more embodiments, the resistance variations $\Delta R_i$ may be due to differences in the nominal, unstressed resistance of the PZR elements, and differences in their piezoresistance changes due to stress. The resistance variations of the PZR elements can be decomposed according to:

$$\Delta R_i = \Delta R_{i0} + \pi_i \sigma_i$$

The first term on the right-hand side of the equation is due to variations in the nominal resistance. The second term is the product of the piezoresistance coefficient, or π-coefficient, and the stress σ in the element.

When the PZR elements are implanted in a single crystal semiconductor material such as silicon, each PZR element in the bridge circuit of PZR sensor 210 has a sense of direction parallel to the net direction current flow 426 between regions in a given PZR element that have higher conductivity relative to the piezoresistive portion, having an angle α relative to the crystal axis 410. Let i be an index representing the number of PZR elements in the bridge circuit such that i=1, . . . , 4 then the average it coefficient $\pi_i$ for each PZR element is an even function of αi such that $\pi_i=\pi(\alpha i)=\pi(-\alpha i)$. With matched nominal resistances $\Delta R_{i0}$, the resistance variation $\Delta R_i$ for PZR sensor 210 may be decomposed as follows:

$$\Delta Ri = (\Pi 0 + \Delta \pi i)(S0 + \Delta \sigma i)$$

The ideal case is a balanced situation that is achieved when:

$$\alpha 1 = -\alpha 2 = -\alpha 3 = \alpha 4$$

which corresponds to the case of balanced nominal resistance and piezoresistance examined above, providing a torsion sensor with bending immunity. The bending immunity is preserved even in the presence of a gradient in the bending stress field such that $$\sigma 1 = \sigma 3 = S1, \sigma 2 = \sigma 4 = S2.$$

A longitudinal stress gradient may appear for pure torsional deformation of flexure 314 of FIG. 3 because the cross section of flexure 314 changes along the portion of the axis of flexure 314 containing the PZR sensor 210. A longitudinal stress gradient can also occur due to out-of-plane bending of flexure 314, however for that case σ1=σ3=S1, σ2=σ4=S2, that is there are no sign reversals of the stress over the PZR sensor 210 and so $\Delta R1=\Delta R3$, $\Delta R2=\Delta R4$. In that case the differential output signal $V_{OUT}=0$.

If the patterning process for forming the PZR elements creates an alignment error, as discussed with respect to FIG. 5 and FIG. 6, below, between the intended resistor orientations and the crystal axis, such as α1=α4=A1, α2=α3=A2, A1≠A2, then the π coefficients will be such that π1=π4=Π1, π2=π3=Π2, Π1≠Π2. For torsion, this imbalance will create nonlinear distortion of the output signal $V_{OUT}$, made worse when there are stress gradients. Likewise, for bending, the imbalance causes the bridge PZR sensor 210 to output a differential signal that would be indistinguishable from a torsion signal, and that is nonlinearly distorted due to nonlinear dependence on the stress.

The alignment inaccuracy of the highly conductive layers that make contact to the PZR elements may create imbalance in the PZR elements that creates a dc differential output when there is no stress in the torsion member. In addition, this misalignment may cause deviations from what is intended for the directions of net current flow relative to the crystal axes 410 for the PZR elements. That is, the angles αi may vary. In this situation, torsional deformation of the flexure 314 results in nonlinear distortion of the bridge output $V_{OUT}$ of PZR sensor 210, such distortion is made worse when there are stress gradients. Furthermore, the PZR bridge is nonlinearly responsive to bending stress, such nonlinearity may be more severe when there are stress gradients across the bridge. The misalignment of the angles αi describing the sense of net current flow in each PZR element therefore degrades the bending immunity of the sensor.

To address alignment inaccuracy, contact pads 422 for PZR sensor 210 may be fabricated from relatively high concentration doped silicon at nodes 424 of PZR sensor 210. In one or more embodiments, contacts 422 are generally rounded in shape and relatively large with respect to nodes 424 such that some amount of process variation misalignment in the doping patterns from which contacts 422 are formed may be tolerated. However, it should be noted that this is merely one example of the possible shape and/or size of contact pads 422 to accommodate process variation wherein other sizes and/or shapes likewise may be utilized, and the scope of the claimed subject matter is not limited in this respect. For example, such other geometries, sizes, and/or shapes of contact pads 422 may include circular shapes, ellipsoid shapes, polygonal shapes, and/or non-polygonal shapes, and the scope of the claimed subject matter is not limited in these respects. Further details of how alignment inaccuracy in the layers of PZR sensor 210 may be accommodated are shown in and described with respect to FIG. 5 and FIG. 6, below.

Figure 5:
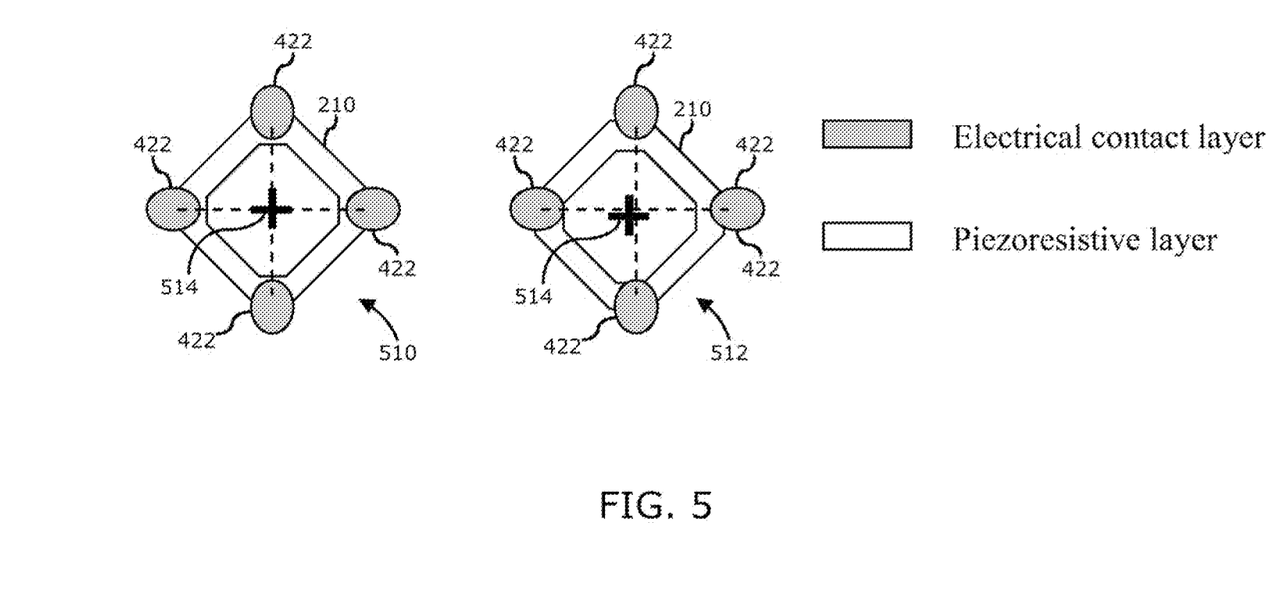
FIG. 5 is a diagram of a layout for the PZR elements of a PZR sensor and respective electrical contacts illustrating layer misalignments in accordance with one or more embodiments.

Referring now to FIG. 5, a layout for the PZR elements of a PZR sensor and respective electrical contacts illustrating layer misalignments in accordance with one or more embodiments will be discussed. In one or more embodiments, variations in the nominal resistance of each of the PZR elements in the PZR sensor 210 may be due to the misalignment of layers during fabrication of the bridge. For a PZR sensor 210 in a bridge circuit formed from a piezoresistive doping implant layer and a contact layer comprising contact pads 422 used to make electrical connections to the PZR sensor 210 but with insignificant piezoresistivity, the alignment between the two layers may cause resistance asymmetry. The arrangement 510 on the lefts shows ideal alignments and therefore equal or sufficiently equal resistance on all PZR elements forming the legs of the bridge. In arrangement 510, contact pads 422 are generally aligned with the center 514 of the PZR sensor 210 bridge. The arrangement 512 on the right shows a misalignment of contact pads 422 with the center 514 of the PZR sensor 210 bridge, which therefore may result in an unequal resistance in the PZR elements forming the legs of the bridge. Such layer misalignments may result in rotations of the angles $\alpha_i$ of the PZR elements with respect to crystal axis 410. For a PZR sensor 210 bridge positioned on one of the flexures of MEMS platform 114, a torsional deformation of a flexure with matched nominal resistances and matched piezoresistances may be:

$$\Delta R_{i0} = 0,$$
$$i = 1, \ldots 4$$
$$\pi_i = \pi_0,$$
$$i = 1, \ldots 4$$
$$\sigma1 = -\sigma2 = -\sigma3 = \sigma4 = S_T.$$
$$\Delta R1 = -\Delta R2 = -\Delta R3 = \Delta R4 = \pi_0 S_0$$
$$V_{OUT} = -V_{IN}\left(\frac{S_T \pi_0}{R_0}\right).$$

For the case of bending of a flexure, for example bending of flexure 318 by rotation of body 328 about axis 326, the stress does not reverse sign over the area of the PZR sensor 210 bridge. Furthermore, if there is no significant gradient in the stress over the dimensions of the PZR bridge, then:

$$\sigma1=\sigma2=\sigma3=\sigma4=S_B$$

$$V_{OUT}=0.$$

The PZR sensor 210 bridge may be immune to the bending stress and may serve purely as a torsion sensor. If there are differences in nominal PZR element resistances, for example due to a layer misalignment as shown at arrangement 512 of FIG. 5, then the torsion response of the PZR sensor 210 contains a dc offset voltage as well as a dynamic component proportional to the dynamic stress. The torsion signal may be determined by ignoring the dc signal level. In one or more embodiments, the dc signal component may be removed from the output signal $V_{OUT}$ of PZR sensor 210 via ac coupling of PZR sensor to amplification stage 222, for example using a coupling capacitor. Differences in the nominal PZR resistances of the PZR elements may also make the PZR sensor 210 bridge sensitive to bending stress. Similar to the torsion case with unbalanced differences in the nominal PZR element resistances, there may be a dc component and a dynamic signal component depending on the bending stress at the PZR sensor 210.

Figure 6:
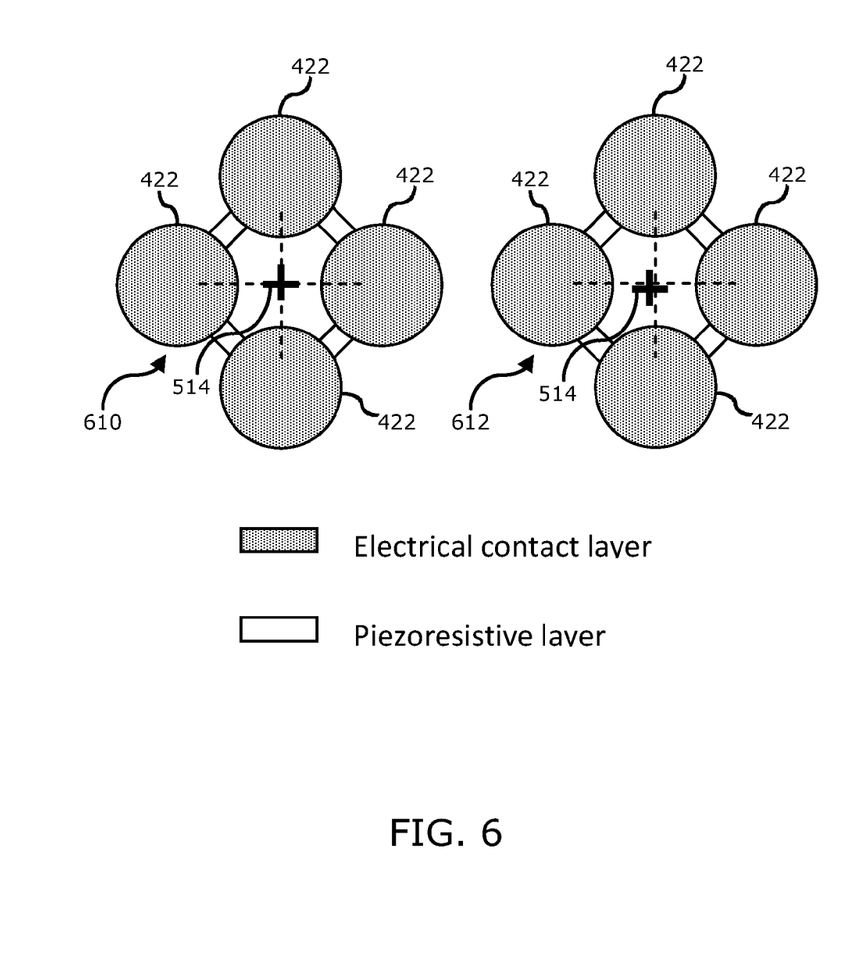
FIG. 6 is a illustration of a layout for the PZR elements of a PZR sensor and respective electrical contacts to reduce sensitivity to layer misalignments in accordance with one or more embodiments.

Referring now to FIG. 6, a layout for the PZR elements of a PZR sensor and respective electrical contacts to reduce sensitivity to layer misalignments in accordance with one or more embodiments will be discussed. In the embodiment shown in FIG. 6, the contact pads 422 are oversized and made roughly circular in shape or have other geometries or shapes as discussed, above. In general, such an oversized contact pad 422 may be sufficiently oversized to accommodate misalignment of contact pads 422 with the nodes of PZR sensor 210 bridge. In one example embodiment, oversized may mean that contact pads 422 are at least 30% larger in size than a width of the legs or branches of PZR sensor 210. In another example embodiment, oversized may mean that contact pads 422 are at least 50% larger in size than a width of the legs or branches of PZR sensor 210. However, these are merely examples of how contact pads 422 may be oversized, and the scope of the claimed subject matter is not limited in these respects. Arrangement 610 on the left shows the contact pads 422 being generally aligned with the center 514 of PZR sensor 210 bridge. As shown in arrangement 612 on the right, in spite of layer misalignment wherein the contact pads 422 are misaligned with the center 514 of PZR sensor 210 bridge, the nominal resistances of the PZR elements are not significantly changed, and the resistance imbalance due to misalignment is reduced, or otherwise effectively eliminated. As a result, PZR sensor 210 bridge has increased stress immunity as a result of the oversized and generally circularly shaped contact pads 422. Furthermore, the arrangement of contact pads 210 and PZR elements tends to eliminate the dependence of $\alpha_i$ on the layer misalignment. However, this is merely one example of how layer misalignment may be accommodated in one or more embodiments of PZR sensor 210, and the scope of the claimed subject matter is not limited in this respect.

Figure 7:
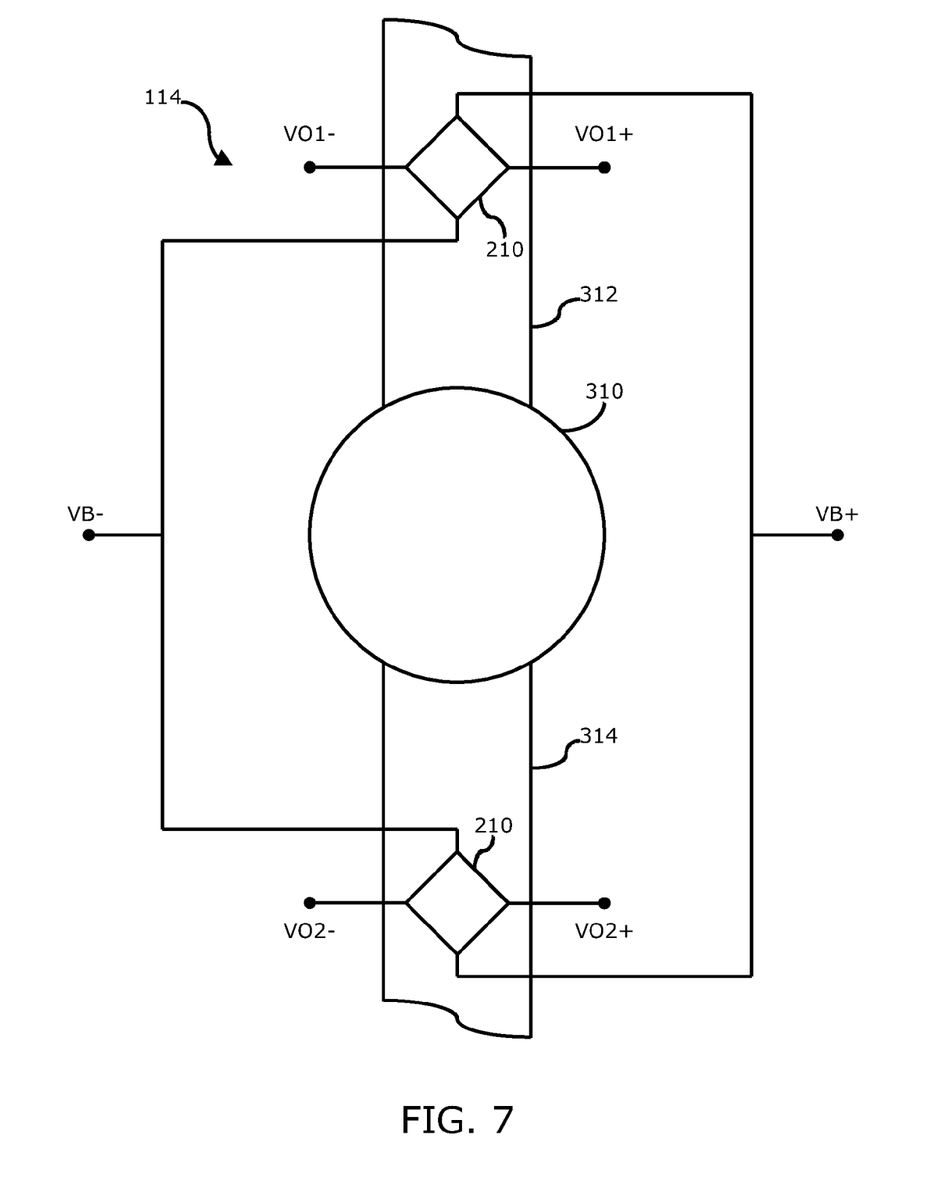
FIG. 7 is a diagram of a dual bridge piezoresistive sensor arrangement in accordance with one or more embodiments.

Referring now to FIG. 7, a diagram of a dual bridge piezoresistive sensor arrangement in accordance with one or more embodiments will be discussed. FIG. 5 shows a portion of the scanning platform 114 depicted in FIG. 3 in which a first PZR sensor 210 is disposed on one flexure 312 and a second PZR sensor 210 is disposed another flexure 314 in a dual PZR sensor 210 arrangement. In such a dual PZR sensor 210 arrangement, the torsion strain output may be approximately doubled which mitigates the effect of bending strain in the output signal of PZR sensor 210. As shown in FIG. 7, two identical PZR sensors 210 may be disposed on corresponding symmetric locations of flexure 312 and flexure 314. The two PZR sensors 210 are coupled in parallel to the same bias circuit at terminals VB+ and VB− to ensure same biasing voltage is applied to both PZR sensors 210. For torsional strain the outputs of the two PZR sensors 210, taken at terminals VO1+ and VO1− for one sensor and terminals VO2+ and VO2− of the other sensor, will have the same magnitude and phase, whereas for bending strain the outputs of the two PZR sensors 210 are out-of-phase with same magnitude. By adding the output signals of the two PZR sensors 210 together, the total output for torsion strain is doubled and the total response to bending strain will be cancelled out, or effectively canceled out. It should be noted that various other arrangements of one or more PZR sensors 210 similarly may be provided to enhance the output signal due to torsion strain with respect to bending strain, and the scope of the claimed subject matter is not limited in this respect. An alternative example arrangement of a PZR sensor 210 is shown in and described with respect to FIG. 8, below.

Figure 8:
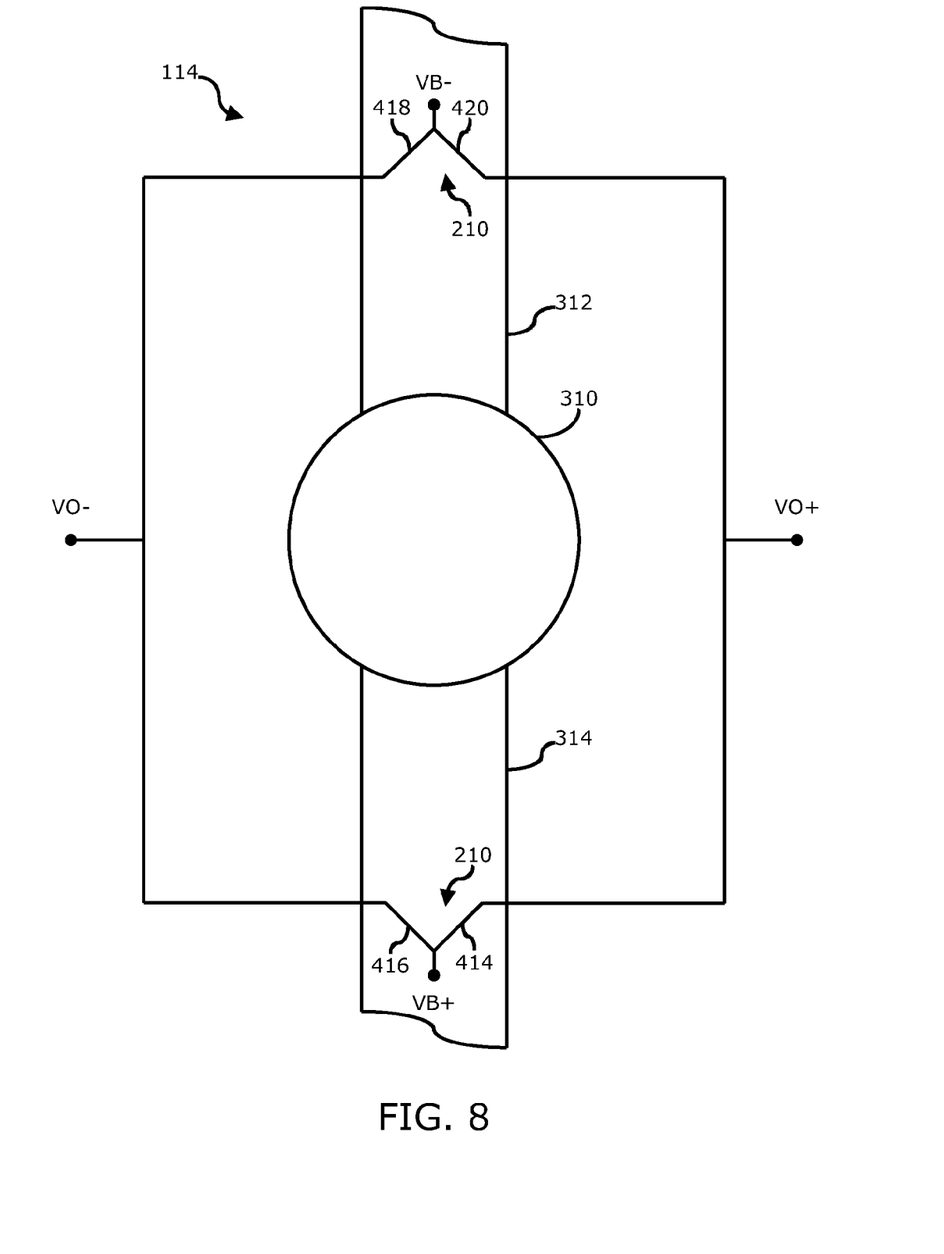
FIG. 8 is a diagram of a split bridge piezoresistive sensor arrangement in accordance with one or more embodiments.

Referring now to FIG. 8, a diagram of a split bridge piezoresistive sensor arrangement in accordance with one or more embodiments will be discussed. The arrangement PZR sensor 210 of FIG. 8 is substantially similar to the arrangement of two PZR sensors 210 as shown in and described with respect to FIG. 7, above, except that a single PZR sensor 210 may be used in a split sensor arrangement. Two PZR elements 418 and 420 comprising one half of PZR sensor 210 are disposed on flexure 312, and the other two PZR elements 414 and 416 comprising the other half of PZR sensor 210 are disposed on flexure 314. The combination of PZR elements 414, 416, 418, and 420 forms a Wheatstone bridge circuit wherein a bias voltage is applied between nodes VB+ and VB−, and the output signal of PZR sensor 210 is obtained between nodes VO+ and VO−. Normally, the Wheatstone bridge circuit should have zero output for bending strain if all four arms are subjected to uniform bending stress state. However, in practice, the small bending stress gradient across each bridge arm may cause noise signal due to the unbalanced resistance change. As shown in FIG. 8, by splitting the Wheatstone bridge circuit of PZR sensor 210 onto corresponding symmetric locations of the respective flexures 312 and 314, all PZR element arms may be subjected to an identical bending stress state since the two halves of PZR sensor 210 are located in the same corresponding positions of the two respective flexures 312 and 314. As a result, the output signal component of PZR sensor 210 due bending stress may be reduced or mitigated, or effectively canceled, with respect to the output signal component due to torsion because the component signals due to bending stress on the two halves of PZR sensor 210 are equal in magnitude but opposite in phase on the respective flexures 312 and 314. It should be noted that this is merely one example of how the output signal of PZR sensor 210 due to bending may be reduced with respect to the output signal of PZR sensor 210 due to torsion wherein various other approaches likewise may be implemented, and the scope of the claimed subject matter is not limited in this respect. In general, in one or more embodiments, the torsion output signal may be increased with respect to the bending output signal, or in one or more embodiments the bending output signal may be reduced with respect to the torsion output signal, or combinations thereof. An example of how a scanned beam display may incorporate a MEMS platform 114 having one or more PZR sensors 210 in accordance with one or more embodiments is shown in and described with respect to FIG. 9, below.

Figure 9:
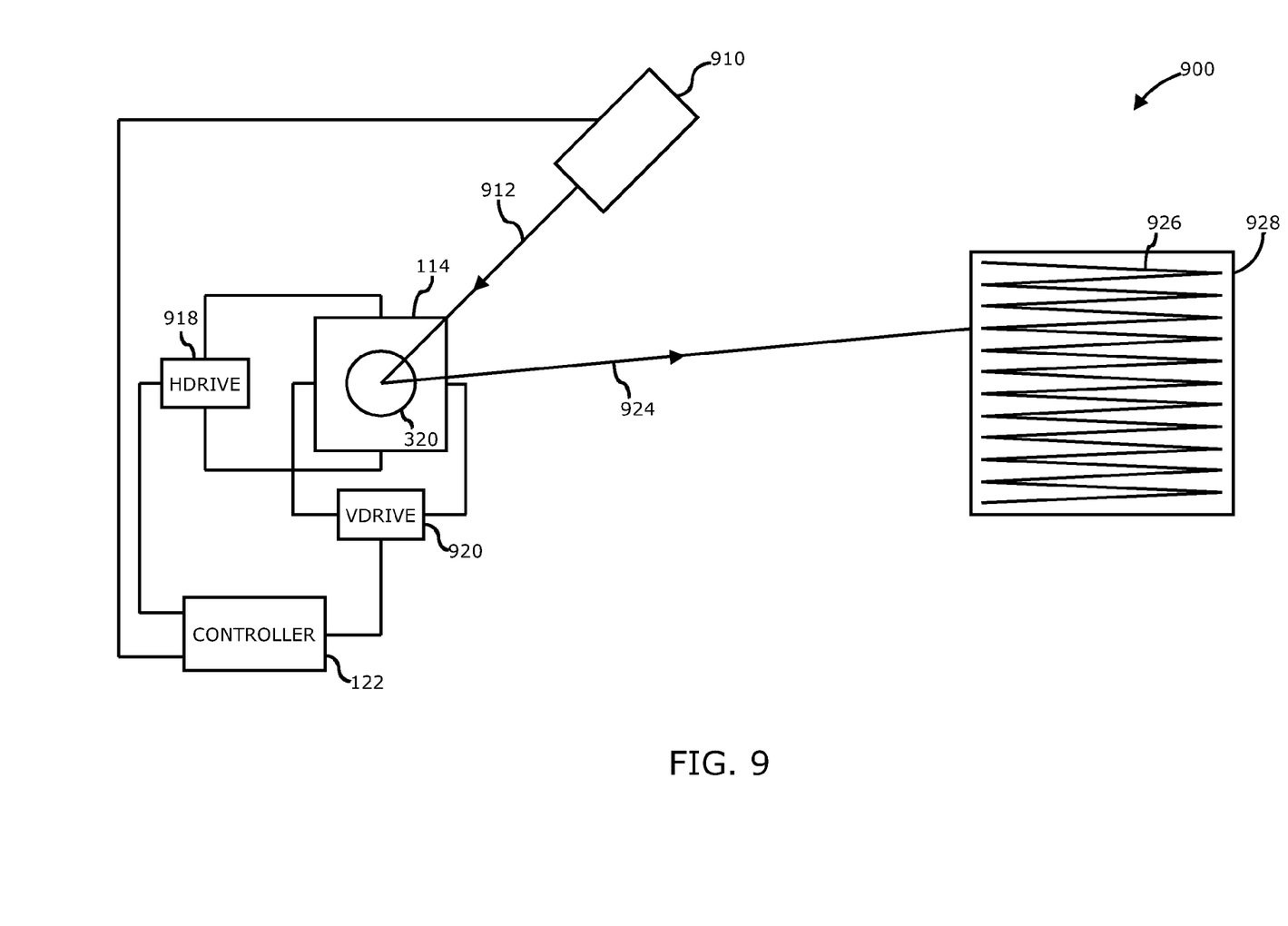
FIG. 9 is a diagram of a scanned beam display in accordance with one or more embodiments.

Referring now to FIG. 9, a diagram of a scanned beam display in accordance with one or more embodiments will be discussed. Scanned beam display 900 of FIG. 9 may include one or more sensors to detect the position of scanning mirror 320 of MEMS platform 114 as discussed in detail, above. Although FIG. 9 illustrates a scanned beam display for purposes of discussion, it should be noted that other types of devices similarly may incorporate a MEMS platform 114 having one or more PZR sensors 210, including but not limited to uniaxial scanning mirrors, pressure sensors, inertial sensors, and so on, and the scope of the claimed subject matter is not limited in this respect.

As shown in FIG. 9, scanned beam display 900 comprises a light source 910, which may be a laser light source or the like, capable of emitting a beam 912 which may comprise a laser beam. In general, scanned beam display 900 may also be referred to as a projector. The beam 912 is incident on a MEMS platform 114 and reflects off of scanning mirror 320 to generate a controlled output beam 924. In one or more alternative embodiments, MEMS platform 114 may comprise one or more scanning mirror elements 320 in a variety of physical configurations. A horizontal drive circuit 918 and/or a vertical drive circuit 920 modulate the direction in which scanning mirror 320 is deflected to cause output beam 924 to generate a biaxial scan 926, thereby creating a displayed image, for example on a display screen and/or image plane 928. Controller 122 controls horizontal drive circuit 918 and vertical drive circuit 920 by converting pixel information of the input image into laser modulation synchronous to the motion of MEMS platform 114 to write the image information as a displayed image based upon the position of the output beam 924 in raster pattern 926 and the corresponding intensity and/or color information at the corresponding pixel in the image. Controller 122 may also control other various functions of scanned beam display 900.

In one or more embodiments, a horizontal axis may refer to the horizontal direction of biaxial scan 926 and the vertical axis may refer to the vertical direction of biaxial scan 926. Scanning mirror 320 may sweep the output beam 924 horizontally at a relatively higher frequency and also vertically at a relatively lower frequency and with a constant velocity over a portion of the scan. The result is a scanned trajectory of laser beam 924 to result in biaxial scan 926. The fast and slow axes may also be interchanged such that the fast scan is in the vertical direction and the slow scan is in the horizontal direction. However, the scope of the claimed subject matter is not limited in these respects.

Figure 10:
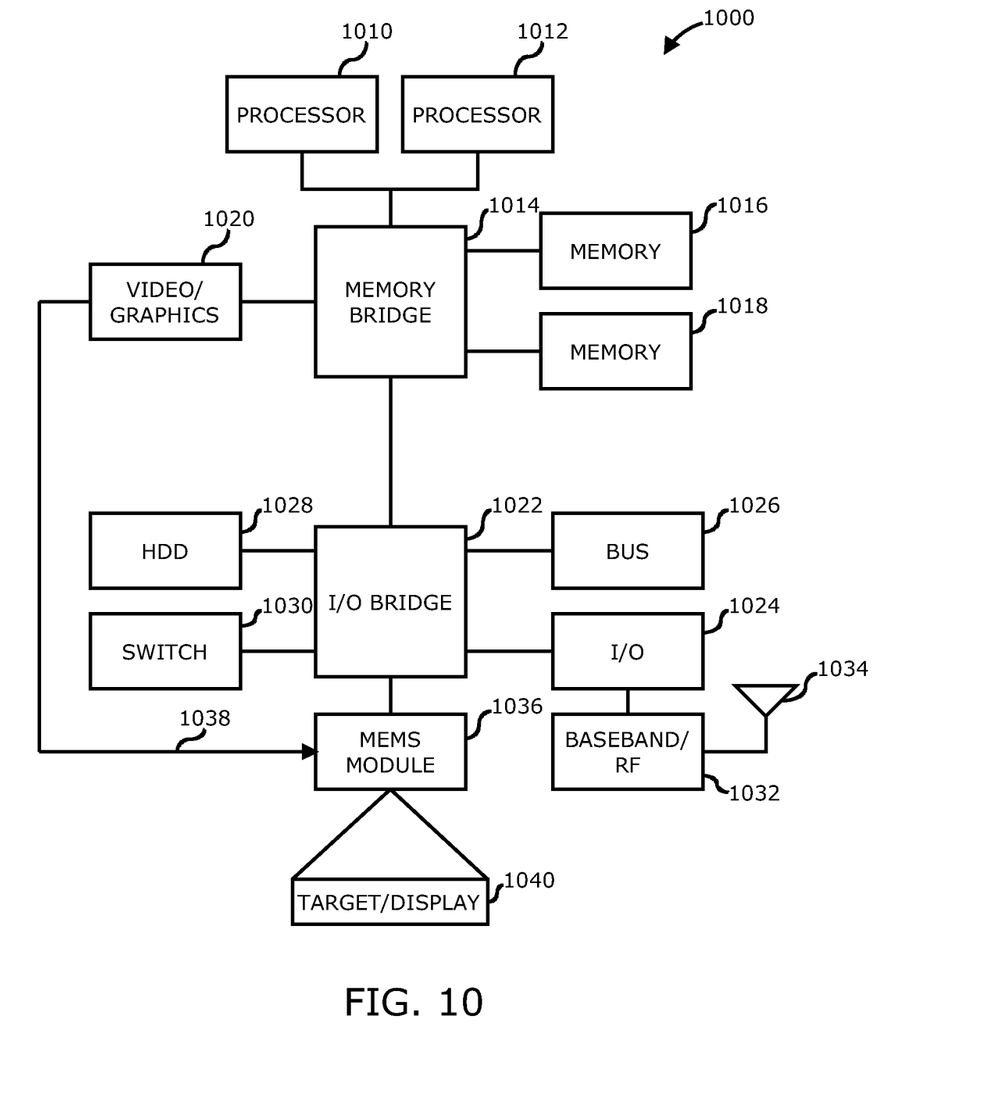
FIG. 10 is a diagram of an information handling system utilizing a scanned beam display in accordance with one or more embodiments.

Referring now to FIG. 10, a diagram of an information handling system utilizing a scanned beam display in accordance with one or more embodiments will be discussed. Information handling system 1000 of FIG. 10 may tangibly embody scanned beam display 900 as shown in and described with respect to FIG. 9, above. Although information handling system 1000 represents one example of several types of computing platforms, including cell phones, personal digital assistants (PDAs), netbooks, notebooks, internet browsing devices, music and/or video players, and so on, information handling system 1000 may include more or fewer elements and/or different arrangements of the elements than shown in FIG. 10, and the scope of the claimed subject matter is not limited in these respects.

Information handling system 1000 may comprise one or more processors such as processor 1010 and/or processor 1012, which may comprise one or more processing cores. One or more of processor 1010 and/or processor 1012 may couple to one or more memories 1016 and/or 1018 via memory bridge 1014, which may be disposed external to processors 1010 and/or 1012, or alternatively at least partially disposed within one or more of processors 1010 and/or 1012. Memory 1016 and/or memory 1018 may comprise various types of semiconductor-based memory, for example volatile type memory and/or non-volatile type memory. Memory bridge 1014 may couple to a video/graphics system 1020 to drive a display device, which may comprise MEMS projector module 1036, coupled to information handling system 1000. MEMS projector module 1036 may comprise scanned beam display 1000 as shown in and described with respect to the various figures herein. In one or more embodiments, video/ graphics system 1020 may couple to one or more of processors 1010 and/or 1012 and may be disposed on the same core as the processor 1010 and/or 1012, although the scope of the claimed subject matter is not limited in this respect.

Information handling system 1000 may further comprise input/output (I/O) bridge 1022 to couple to various types of I/O systems. I/O system 1024 may comprise, for example, a universal serial bus (USB) type system, an IEEE 1394 type system, or the like, to couple one or more peripheral devices to information handling system 1000. Bus system 1026 may comprise one or more bus systems such as a peripheral component interconnect (PCI) express type bus or the like, to connect one or more peripheral devices to information handling system 1000. A hard disk drive (HDD) controller system 1028 may couple one or more hard disk drives or the like to information handling system, for example Serial Advanced Technology Attachment (Serial ATA) type drives or the like, or alternatively a semiconductor based drive comprising flash memory, phase change, and/or chalcogenide type memory or the like. Switch 1030 may be utilized to couple one or more switched devices to I/O bridge 1022, for example Gigabit Ethernet type devices or the like. Furthermore, as shown in FIG. 10, information handling system 1000 may include a baseband and radio-frequency (RF) block 1032 comprising a base band processor and/or RF circuits and devices for wireless communication with other wireless communication devices and/or via wireless networks via antenna 1034, although the scope of the claimed subject matter is not limited in these respects.

In one or more embodiments, information handling system 1000 may include MEMS projector module 1036 that may correspond to MEMS platform 114 of FIG. 1, and which may include any one or more or all of the components of scanned beam display 900 of FIG. 9, for example controller 122, horizontal drive circuit 918, vertical drive circuit 920, and/or laser source 910. In one or more embodiments, projector 1036 may be controlled by one or more of processors 1010 and/or 1012 to implements some or all of the functions of controller 122 of FIG. 1. In one or more embodiments, projector 1036 may comprise a MEMS based scanned beam display for displaying an image projected by projector 1036 where the image may likewise be represented by target/display 1040. In one or more embodiments, a scanned beam projector may comprise video/graphics block 1020 having a video controller to provide video information 1038 to projector 1036 to display an image represented by target/display 1040. In one or more embodiments, MEMS module 1036 may comprise one or more components of scanned beam display 900 of FIG. 9, for example MEMS platform 114 having one or more PZR sensors 210 as shown and described herein. However, these are merely example implementations for projector 1036 within information handling system 1000, and the scope of the claimed subject matter is not limited in these respects.

Although the claimed subject matter has been described with a certain degree of particularity, it should be recognized that elements thereof may be altered by persons skilled in the art without departing from the spirit and/or scope of claimed subject matter. It is believed that the subject matter pertaining to piezoresistive sensors for a MEMS device having rejection of undesired motion and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A piezoresistive stress sensor, comprising:
   a plurality of piezoresistive elements coupled together at a plurality of nodes in a bridge circuit;
   wherein the bridge circuit is disposed on, near, or contiguous to a flexure to detect torsional flexing about an axis of the flexure, the bridge circuit having at least two nodes disposed along the axis of the flexure and at least two nodes disposed off the axis of the flexure to maximize, or nearly maximize, an output of the bridge circuit in response to the torsional flexing of the flexure; and
   a plurality of contact pads coupled to the plurality of nodes to electrically contact with the bridge circuit, the plurality of contact pads being sufficiently oversized with respect to a width dimension of the plurality of piezoresistive elements to accommodate misalignment of the contact pads with the plurality of nodes.

2. A piezoresistive stress sensor as claimed in claim 1, wherein the bridge circuit comprises a Wheatstone bridge.

3. A piezoresistive stress sensor as claimed in claim 1, wherein the plurality of contact pads comprise relatively high concentration doped silicon.

4. A piezoresistive stress sensor as claimed in claim 1, wherein the contact pads are generally circular in shape, generally elliptical in shape, generally polygonal in shape, or generally non-polygonal in shape, or combinations thereof.

5. A MEMS scanning platform, comprising:
   a frame;
   a suspended body coupled to the frame via at least one or more flexures, the suspended body having a mirrored surface disposed thereon; and
   at least one or more piezoresistive sensors disposed on, near, or contiguous to at least one of the flexures, the at least one or more piezoresistive sensors comprising:
   a plurality of piezoresistive elements coupled together at a plurality of nodes in a bridge circuit; and
   wherein a torsional flexing component of an output signal of the bridge circuit is relatively increased with respect to a component of the output signal generated by non-torsional stress of the flexure, or wherein a component of the output signal generated by non-torsional stress of the flexure is reduced with respect to the torsional flexing component of the output signal, or combinations thereof.

6. A MEMS scanning platform as claimed in claim 5, wherein the bridge circuit is disposed to detect torsional flexing about an axis of the flexure, the bridge circuit having at least two nodes disposed along the axis of the flexure and at least two nodes disposed off the axis of the flexure to maximize, or nearly maximize, an output signal of the bridge circuit generated in response to the torsional flexing of the flexure.

7. A MEMS scanning platform as claimed in claim 5, further comprising a plurality of contact pads coupled to the plurality of nodes to electrically contact with the bridge circuit, the plurality of contact pads being sufficiently oversized with a respect to a width dimension of the plurality piezoresistive elements to accommodate misalignment of the contact pads with the plurality of nodes.

8. A MEMS scanning platform as claimed in claim 7, wherein the plurality of contact pads comprise high concentration doped silicon.

9. A MEMS scanning platform as claimed in claim 7, wherein the contact pads are generally circular in shape, generally elliptical in shape, generally polygonal in shape, or generally non-polygonal in shape, or combinations thereof.

10. A MEMS scanning platform as claimed in claim 5, wherein the bridge circuit comprises a Wheatstone bridge.

11. A MEMS scanning platform as claimed in claim 5, wherein:
a first piezoresistive sensor is disposed on, near, or contiguous to a first flexure at a first position along the first flexure, and second piezoresistive sensor is disposed on, near, or contiguous to a second flexure at a second position along the second flexure symmetrical or nearly symmetrical to the first position, the first and second piezoresistive sensors having a mutual bias voltage and a combined output such that the combined output has a torsional flexure component that is approximately twice the torsional flexing component of the respective first or second piezoresistive sensors, and such that non-torsional components of the respective first and second piezoresistive sensors cancel out, or nearly cancel out, the combined output.

12. A MEMS scanning platform as claimed in claim 5, wherein:
the at least one or more piezoresistive elements comprises a first pair of piezoresistive elements disposed on, near, or contiguous to on, near, or contiguous to a first flexure at a first position along the first flexure, and second pair piezoresistive elements disposed on, near, or contiguous to a second flexure at a second position along the second flexure symmetrical or nearly symmetrical to the first position, the first pair and the second pair of piezoresistive elements being coupled to form a single piezoresistive sensor in a bridge circuit having an output signal representative of stress of the first flexure and the second flexure such that non-torsional components of the respective first and second pairs of piezoresistive elements cancel out, or nearly cancel out, the output signal.

13. A scanned beam display, comprising:
at least one or more light sources to generate a light beam; and
a MEMS scanning platform to scan the beam of light in a pattern, the MEMS scanning platform comprising:
a frame;
a suspended body coupled to the frame via at least one or more flexures, the suspended body having a mirrored surface disposed thereon; and
at least one or more piezoresistive sensors disposed on, near, or contiguous to at least one of the flexures, the at least one or more piezoresistive sensors comprising a plurality of piezoresistive elements coupled together at a plurality of nodes in a bridge circuit; and
wherein a torsional flexing component of an output signal of the bridge circuit is relatively increased with respect to a component of the output signal generated by non-torsional stress of the flexure, or wherein a component of the output signal generated by non-torsional stress of the flexure is reduced with respect to the torsional flexing component of the output signal, or combinations thereof.

14. A scanned beam display as claimed in claim 13, wherein the bridge circuit is disposed to detect torsional flexing about an axis of the flexure, the bridge circuit having at least two nodes disposed along the axis of the flexure and at least two nodes disposed off the axis of the flexure to maximize, or nearly maximize, an output signal of the bridge circuit generated in response to the torsional flexing of the flexure.

15. A scanned beam display as claimed in claim 13, the bridge circuit further comprising a plurality of contact pads coupled to the plurality of nodes to electrically contact with the bridge circuit, wherein the contact pads are generally circular in shape, generally elliptical in shape, generally polygonal in shape, or generally non-polygonal in shape, or combinations thereof.

16. A scanned beam display as claimed in claim 15, wherein the plurality of contact pads of the bridge circuit comprise high concentration doped silicon.

17. A scanned beam display as claimed in claim 15, wherein the plurality of contact pads of the bridge circuit are sufficiently oversized with respect to a width dimension of the plurality of piezoresistive elements to accommodate misalignment of the contact pads with the plurality of nodes.

18. A scanned beam display as claimed in claim 13, wherein the bridge circuit comprises a Wheatstone bridge.

19. A scanned beam display as claimed in claim 13, wherein:
a first piezoresistive sensor is disposed on, near, or contiguous to a first flexure at a first position along the first flexure, and second piezoresistive sensor is disposed on, near, or contiguous to a second flexure at a second position along the second flexure symmetrical or nearly symmetrical to the first position, the first and second piezoresistive sensors having a mutual bias voltage and a combined output such that the combined output has a torsional flexure component that is approximately twice the torsional flexing component of the respective first or second piezoresistive sensors, and such that non-torsional components of the respective first and second piezoresistive sensors cancel out, or nearly cancel out, the combined output.

20. A scanned beam display as claimed in claim 13, the at least one or more piezoresistive elements comprises a first pair of piezoresistive elements disposed on, near, or contiguous to a first flexure at a first position along the first flexure, and second pair piezoresistive elements disposed on, near, or contiguous to a second flexure at a second position along the second flexure symmetrical or nearly symmetrical to the first position, the first pair and the second pair of piezoresistive elements being coupled to form a single piezoresistive sensor in a bridge circuit having an output signal representative of stress of the first flexure and the second flexure such that non-torsional components of the respective first and second pairs of piezoresistive elements cancel out, or nearly cancel out, the output signal.

* * * * *